United States Patent
McRae et al.

(10) Patent No.: US 11,856,073 B1
(45) Date of Patent: Dec. 26, 2023

(54) MESSAGE BATCHING FOR COMMUNICATION PROTOCOLS

(71) Applicant: Amazon Technologies, Inc., Seattle, WA (US)

(72) Inventors: Tanner McRae, San Francisco, CA (US); Martin Schade, Belmont, CA (US)

(73) Assignee: Amazon Technologies, Inc., Seattle, WA (US)

(*) Notice: Subject to any disclaimer, the term of this patent is extended or adjusted under 35 U.S.C. 154(b) by 76 days.

(21) Appl. No.: 16/362,418

(22) Filed: Mar. 22, 2019

(51) Int. Cl.
*H04L 29/08* (2006.01)
*H04L 67/565* (2022.01)
*H04L 67/12* (2022.01)
*H04L 67/568* (2022.01)
*H04L 67/53* (2022.01)

(52) U.S. Cl.
CPC ............ *H04L 67/565* (2022.05); *H04L 67/12* (2013.01); *H04L 67/568* (2022.05); *H04L 67/53* (2022.05)

(58) Field of Classification Search
CPC . H04L 67/2823; H04L 67/12; H04L 67/2842; H04L 67/20
See application file for complete search history.

(56) References Cited

U.S. PATENT DOCUMENTS

| | | | | |
|---|---|---|---|---|
| 7,949,630 B1* | 5/2011 | Auchmoody | ....... | G06F 11/1469 707/609 |
| 9,977,760 B1* | 5/2018 | Diehl | ...................... | G06F 16/13 |
| 2003/0018685 A1* | 1/2003 | Kalafatis | ............... | G06F 9/3802 718/102 |
| 2005/0038863 A1* | 2/2005 | Onyon | ................. | G06Q 10/107 709/207 |
| 2006/0020578 A1* | 1/2006 | Hood | ..................... | G06F 9/4493 |
| 2012/0166582 A1* | 6/2012 | Binder | .................. | G06F 21/602 709/217 |
| 2012/0227089 A1* | 9/2012 | Lee | ........................ | H04L 9/3234 726/4 |
| 2014/0201838 A1* | 7/2014 | Varsanyi | ............... | G06F 21/552 726/23 |
| 2015/0271299 A1* | 9/2015 | Bullotta | .................. | H04W 4/70 709/230 |
| 2015/0373162 A1* | 12/2015 | Mosko | .................... | H04L 45/40 370/392 |

(Continued)

OTHER PUBLICATIONS

ETSI TS 118 110 v 1.0.0 (Feb. 2015)—MQTT Protocol Binding, Feb. 2015, https://www.etsi.org/deliver/etsi_ts/118100_118199/118110/01.00.00_60/ts_118110v010000p.pdf (Year: 2015).*

*Primary Examiner* — Ninos Donabed
(74) *Attorney, Agent, or Firm* — Knobbe Martens Olson & Bear LLP

(57) ABSTRACT

A framework in which computing devices can divide messages into chunks or sub-portions for transmission in accordance with a topic-based messaging protocol. A caching service facilitates the receipt of a set of messages with individual sub-portions. The caching service uses embedded information in the sub-portion messages to determine when a full set of sub-portions have been received. The caching service can release a completed set of sub-portion messages to an intended network service recipient or utilizing time expiration caching criteria to wait for additional messages.

25 Claims, 9 Drawing Sheets

(56) References Cited

U.S. PATENT DOCUMENTS

| | | | |
|---|---|---|---|
| 2016/0066212 A1* | 3/2016 | Visweswara | H04W 48/00 |
| | | | 370/474 |
| 2016/0269351 A1* | 9/2016 | Talwar | H04L 51/16 |
| 2016/0352795 A1* | 12/2016 | Badulescu | H04L 65/762 |
| 2017/0026405 A1* | 1/2017 | Vengalil | H04L 63/1458 |
| 2018/0097748 A1* | 4/2018 | Pienescu | G06F 16/285 |
| 2019/0332522 A1* | 10/2019 | Leydon | H04L 65/4084 |
| 2020/0162537 A1* | 5/2020 | Waghmare | H04L 69/16 |

* cited by examiner

MESSAGE BATCHING FOR COMMUNICATION PROTOCOLS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the computing devices that communicate via the communication network can correspond to devices having a primary function as a computing device, such as a desktop personal computer. In other environments, at least some portion of the computing devices that exchange information via the communication network can correspond to embedded devices or thin devices that have at least one alternative primary function, such as household appliances having a separate primary purpose (e.g., a thermostat or refrigerator) while also providing at least limited computing functionality. In some instances, the local user interfaces of these embedded devices or thin devices are limited.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
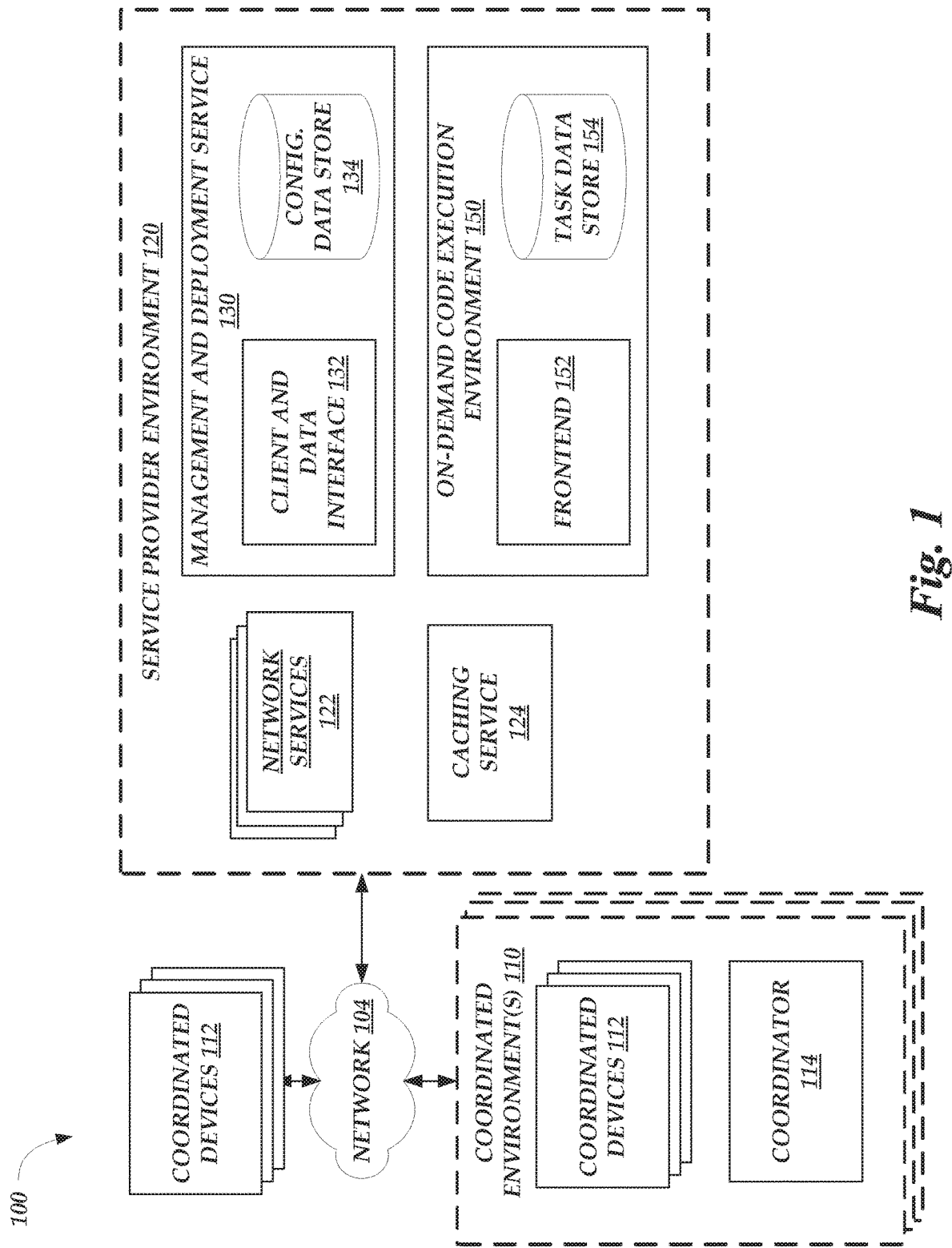
FIG. 1 is a block diagram depicting an illustrative environment in which a coordinator can operate to locally manage and coordinate operation of coordinated devices within a coordinated environment, and wherein the coordinator may communicate with client devices and a service provider environment to implement workflows.

Generally described, aspects of the present disclosure relate to the processing of messages in a networked environment. In some instances, one or more devices may correspond to embedded devices or thin devices that are configured to communicate in accordance with a messaging protocol, such as the topic-based Message Queueing Telemetry Transport ("MQTT") messaging protocol. Such devices may in some instances be referred to as "Internet-of-Things" devices, or "IoT" devices. In accordance with such messaging protocols, the computing devices can generate messages that include a payload or content for transmission to other computing devices or network services.

Generally, some messaging protocols, such as the MQTT messaging protocol, specifies a maximum message size for individual message payloads. For example, a typical configuration of the MQTT messaging protocol limits payloads to no more than 256 Megabytes (256 MB) of data for any individual message transmitted by a device, generally referred to as a message size maximum. Still further, in some implementations, a communication network supporting messaging protocol communications can further limit the maximum payload size to lesser values based on network limitations, resources constraints, or other preferences. For computing devices attempting to transmit content, such as larger images, video or robust sensor data, such content will often exceed the message size maximums associated or configured for the messaging protocol. Although it may be possible for a computing device to utilize a different communication protocol to support larger payload size, such as the hypertext transfer protocol ("HTTP") protocol, thin computing devices and communication networks are generally not well-suited to support multiple or more complex communication protocols.

To support larger payloads within a messaging protocol with message size maximums, it may be possible to subdivide content into sub-portions in which individual sub-portions fall within the message size maximum. The resulting sub-portions can be transmitted separately as a batch of individual transmissions. Although sub-dividing payloads allows for use of messaging protocols that implement payload message size maximums, such approaches are not well-suited in situations in which messages are lost, delayed or received out of order. Accordingly, computing devices that are recipients of the batched messages either fail the entire message transmission that encounter delays or out of order transmissions or otherwise consume additional resources processing such delayed or lost batched messages.

To address potential inefficiencies associated with networks with computing devices implementing messaging protocols with message size maximums, a framework for dividing messages into chunks or sub-portions for transmission in accordance with a messaging protocol is provided. The framework is illustratively implemented in a communication network having one or more computing devices configured to communicate in accordance with a messaging protocol, such as the topic-based MQTT messaging protocol. One implementation of such computing devices can include coordinated devices or coordinator devices implemented in accordance with a coordinated network or environment. Another implementation can include coordinated devices communicating directly with network services via a communication network. Coordinated devices can be referred to generally as IoT devices.

Additionally, the present application includes a caching service or caching layer that facilitates the receipt of a set of messages with individual sub-portions of a payload. The caching service or caching layer uses embedded information in the sub-portion messages to determine when a full set of sub-portions have been received. Additionally, the caching service or caching layer leverages timing information associated with cached data, such as time to live ("TTL") for handling delayed or lost messages with sub-portions. The caching service can release a completed set of sub-portion messages to an intended recipient, such as network service recipient or an on-demand execution service.

One or more aspects of the present application will be described with regard to the implementation of specific messaging protocols, including the topic-based MQTT protocol, or illustrative examples, such as specific configuration of computing devices implemented as coordinated or coordinator devices. Other examples will utilize specific message size thresholds or illustrative payload sizes. However, such examples are illustrative in nature and should not necessarily be construed as limiting.

As will be appreciated by one of skill in the art in light of the present disclosure, the embodiments disclosed herein improves the ability of computing systems, and particularly computing systems implementing limited size messaging protocols to exchange content. Specifically, the present disclosure provides a highly configurable framework to sub-divide content in accordance with message size maximums and transmit the content as a set of sub-portions. The present disclosure further provides a highly flexibly caching service or caching layer that allows for the management of incoming batched messages, especially with regard to lost, delayed or out of order messages. Thus, the embodiments disclosed herein represent an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100, including one or more coordinated environments 110 in which a coordinator 114 may operate to control coordinated devices 112, as well as individual coordinated devices 112 outside of a coordinated environment 110, and a service provider environment 120 that may receive communications from the coordinated devices 112 or coordinators 114 in accordance with a messaging protocol.

The coordinated environments 110 and service provider environment 120 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the communication protocols used by the network 104 may primarily include the MQTT topic-based messaging protocol that is configured with a message size maximum (e.g., 256 MB for payloads). Such communication protocols can be further configured with different message size maximums or a set of message size maximums. Although not required, the network 104 can support additional communication protocols, including, but not limited to Hypertext Transfer Protocol (HTTP), HTTP Secure (HTTPS), MQTT, Constrained Application Protocol (CoAP), and the like. Protocols and components for communicating via the Internet or any of the other aforementioned types of communication networks are well known to those skilled in the art and, thus, are not described in more detail herein. While some embodiments disclosed herein may utilize known protocols, such as MQTT, accord to a standard implementation of such protocols, other embodiments may vary the implementation of such protocols.

Each coordinated environment 110 may include a coordinator 114 and any number of coordinated devices 112, in communication via a network of the coordinated environment 110 (which network is not shown in FIG. 1). Because of their association within the coordinated environment 110, the coordinated devices 112 and coordinator 114 within a given environment 110 may be considered "local" to one another, in terms of communications network. For example, the coordinated devices 112 and coordinator 114 within a given coordinated environment 110 may be connected via a LAN or other localized communication network. The coordinated devices 112 and coordinator 114 may communicate with one another over such a localized communication network, in accordance with the embodiments described herein. In some instances, communications between a coordinated device 112 and coordinator 114 may be encrypted, such as via Transport Layer Security cryptographic protocol. Illustratively, a coordinator 114 may be provisioned with a security certificate that verifies a digital identify of the coordinator. The security certificate may be signed by a public certificate authority or a private certificate authority (e.g., established by the service provider environment 120).

Each coordinated device 112 can correspond to a computing device configured to communicate with the coordinator 114 to manage functionality of the coordinated device 112. In some instances, coordinated devices 112 can correspond to fully featured computing devices, such as laptops, desktops, standalone media players, etc., with robust localized user interface capabilities. In other instances, coordinated devices 112 can correspond to thin devices or embedded devices associated with another primary function, such as a device embedded within or attached as an accessory to a household appliance or device (such as a refrigerator, washing machine, hot water heater, furnace, door lock, light bulb, electrical outlet, electrical switch, etc.). Such appliances or devices are in some contexts referred to as "smart" devices, IoT devices, or "connected" devices. As such, the coordinated devices 112 may include limited local user interfaces, and be configured for remote management. In some instances, coordinated devices 112 may be stateful, and operate to alter their state in response to instructions (e.g., by turning from "off" to "on," etc.).

As described in more detail below (e.g., with respect to FIG. 2), the coordinator 114 can correspond to a computing device executing instructions to coordinate, manage, or control operation of the coordinated devices 112, without requiring that instructions transmitted to the coordinated devices 112 travel outside the coordinated environments 110 (thus increase the security of such instructions and increasing the speed of their transmission). Specifically, the coordinator 114 can include a processor and memory collectively configured to manage communications between any combination of coordinated devices 112, client devices 102, and devices of the service provider network 120. The coordinator can further be configured to enable executions of tasks, in a manner similar to an on-demand code execution environment 150 of the service provider environment 120. These tasks may implement a variety of user-defined or non-user-defined functionalities, including communicating with coordinated devices 112, client devices 102, and devices of the service provider network 120. As such, the coordinator 114 can be configured to allow for manual, automatic, or semi-automatic control of coordinated devices 112. For example, the coordinator 114 may enable a client device 102 to transmit a request to change the state of a coordinated device 112, and cause such a change in state to occur. As a further example, the coordinator 114 may enable a user to specify a criterion under which a state of a coordinated device 112 should be changed, and then automatically operate to change the state of the coordinated device 112 when the criterion is satisfied.

As will be discussed below, many functions of the coordinator 114 may be established via tasks, enabling rapid alteration of these functions as desired by a user. In some instances, such tasks (or dependencies of such tasks, such as libraries, drivers, etc.) may be provided by a user of the coordinator. In other instances, such tasks may be provided to the coordinator 114 by a service provider environment 120. For example, the service provider environment 120 may maintain a library of tasks available to coordinators 114, as well as types of coordinated devices 112 to which such tasks can apply (e.g., all devices, a specific device model, devices of a specific manufacturer, type, or function, etc.). The service provider environment 120 may then provide all or some tasks to a coordinator 114 appropriate for the coordinated devices 112 in a coordinated environment 110 of the coordinator 114, or notify a user of the availability of such tasks. In one embodiment, a user may notify the service provider environment 120 or the coordinator 114 as to the coordinated devices 112 in the coordinated environment 110. In another embodiment, the coordinator 114 may be configured to determine characteristics of coordinated devices 112 within a coordinated environment 110 based on transmissions of those devices. Illustratively, on receiving a communication from a coordinated device 112 (e.g., in response to a user-initiated pairing, based on automated transmissions, etc.), a coordinator 114 may compare a content or format of the transmission to information mapping formats or contents to different device times. Such a mapping may be maintained by the service provider environment 120, and updated based on data collected from various coordinators 114. In some instances, rather than mapping transmission to device types, a coordinator 114 may function to map transmissions to tasks appropriate for a device 112, regardless of whether the type of the device 112 is known. For example, the service provider environment 120 may collect, for an established environment 110 with one or more coordinated devices 112, data identifying a content or format of transmission of such devices 112 and the tasks utilized to manage operation of such devices 112. Thereafter, newly created coordinated environments 110 may be monitored for identical or similar transmissions, and the tasks utilize in the established environment 110 may be presented for potential use in the newly create environment 110. In still other embodiments, a coordinator 114 may utilize standardized discovery protocols, such as the Universal Plug and Play (UPnP) set of protocols, to discover devices 112 within a coordinated environment 110.

The service provider environment 120 can include a number of services or components to enable configuration of, management of, and communications with coordinated devices 112 or coordinators 114. Specifically, the service provider environment 120 includes a set of network services 122 that function as recipients of messages from coordinated devices 112, a management and deployment service 130 to enable registration of coordinators 114 with the service provider environment 120 and configuration of such coordinators 114 and an on-demand code execution environment 150 providing on-demand, dynamic execution of tasks, as well as deployment and provisioning of tasks on coordinators 114. The service provider environment 120 further includes a caching service 124 that implements a set of computing devices to receive sub-portion messages from coordinated devices 112 or coordinators 114 and forward to the network services 122 or on-demand code execution environment 150 as described herein.

As shown in FIG. 1, the management and deployment service 130 includes a client and data interface 132 and a configuration data store 134 that may operate collectively to enable registration of a coordinator 114 with the management and deployment service 130, generation of configurations for the coordinator 114, and transmission of configuration data to the coordinator 114. Illustratively, the client and data interface 132 may provide one or more user interfaces (e.g., APIs, CLIs, GUIs, etc.) through which a user, via a client device 102, may generate or submit a configuration of a coordinator 114 for storage in the configuration data store 134. The client and data interface 132 may further provide one or more interfaces through which a coordinator 114 may obtain the configuration, such that the coordinator 114 is reconfigured according to the obtained configuration. The configuration data store 134 can correspond to any persistent or substantially persistent data store, such as a hard drive (HDD), a solid state drive (SSD), network attached storage (NAS), a tape drive, or any combination thereof.

The on-demand code execution environment 150 can include a number of devices providing on-demand execution of tasks (e.g., portable code segments). Specifically, the on-demand code execution environment 150 can include a frontend 152, through which users, via client device 102, may submit tasks to the on-demand code execution environment 150 and call for execution of tasks on the on-demand code execution environment 150. Such tasks may be stored, for example, in a task data store 154, which can correspond to any persistent or substantially persistent data store, such as a hard drive (HDD), a solid state drive (SDD), network attached storage (NAS), a tape drive, or any combination thereof. While not shown in FIG. 1, the on-demand code execution environment 150 can include a variety of additional components to enable execution of tasks, such as a number of execution environments (e.g., containers or virtual machines executing on physical host devices of the on-demand code execution environment 150), a worker manager to manage such execution environments, and a warming pool manager to assist in making execution environments available to the worker manager on a rapid basis (e.g., under 10 ms).

As noted above, tasks may be transmitted to the on-demand code execution environment 150 and or utilized at the coordinators 114. As noted above, tasks correspond to individual collections of user code (e.g., to achieve a specific function). References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. Specific executions of that code are referred to herein as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 150 or a coordinator 114 in a variety of manners. In one embodiment, a coordinated device 102 or other computing device may transmit a request to execute a task, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of a coordinator 114, a network-accessible storage service, or the task data store 154) prior to the request being received by the coordinator 114 or the on-demand code execution system 150. A request interface of the coordinator 114 or the on-demand code execution system 150 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

A call to execute a task may specify one or more third-party libraries (including native libraries) to be used along with the user code corresponding to the task. In one embodiment, the call may provide to a coordinator 114 or the on-demand code execution system 150 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, or the computing resources (e.g., memory, etc.) to be reserved for executing the program code. For example, the program code of a task may be provided with the call, previously uploaded by the user, provided by the coordinator 114 or the on-demand code execution system 150 (e.g., standard routines), and/or provided by third parties. In some embodiments, such resource-level constraints (e.g., how much memory is to be allocated for executing a particular user code) are specified for the particular task, and may not vary over each execution of the task. In such cases, the coordinator 114 or the on-demand code execution system 150 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 150 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the coordinator 114 or the on-demand code execution system 150 may inspect the call and look for the flag or the header, and if it is present, the coordinator 114 or the on-demand code execution system 150 may modify the behavior (e.g., logging facilities) of the execution environment in which the task is executed, and cause the output data to be provided back to the user. In some embodiments, the behavior/mode indicators are added to the call by the user interface provided to the user by the coordinator 114 or the on-demand code execution system 150. Other features such as source code profiling, remote debugging, etc. may also be enabled or disabled based on the indication provided in a call. Still further as discussed above, in certain embodiments, the call may specify a file location and expected inputs/outputs from the file location that correspond to access of resources local to specific coordinated devices 112 that will execute the task.

The service provider environment 120 is depicted in FIG. 1 as operating in a distributed computing environment including several computer systems that are interconnected using one or more computer networks (not shown in FIG. 1). The service provider environment 120 could also operate within a computing environment having a fewer or greater number of devices than are illustrated in FIG. 1. Thus, the depiction of the service provider environment 120 in FIG. 1 should be taken as illustrative and not limiting to the present disclosure. For example, the service provider environment 120 or various constituents thereof could implement various Web services components, hosted or "cloud" computing environments, and/or peer to peer network configurations to implement at least a portion of the processes described herein. For example, caching service 124 may be implemented in a distributed manner as a set of a caching components that are configured to receive messages from coordinated devices 112. The individual distributed individual caching components can collectively store the received information in a memory, such as a shared memory. In another example, the caching service 124 may be implemented as a caching layer local, such as a local memory or file that can index content, to a computing device, such as a computing device specifically associated with a network service 122.

Further, the service provider environment 120 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

Figure 2:
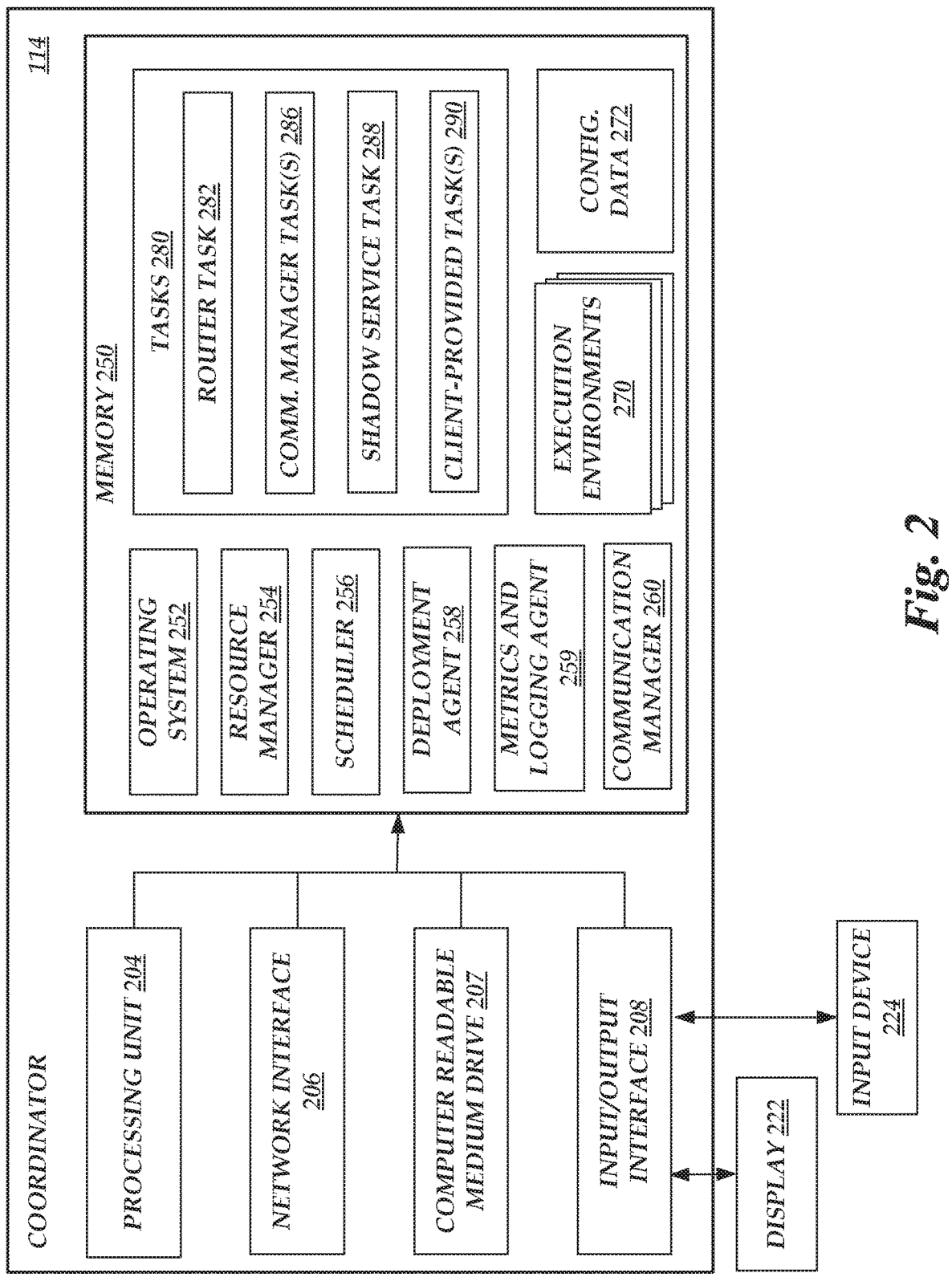
FIG. 2 depicts a general architecture of a computing device providing a coordinator of FIG. 1.

FIG. 2 depicts a general architecture of a computing system (referenced as coordinator 114) that manages coordinated devices 112 within a given coordinated environment 110. The general architecture of the coordinator 114 depicted in FIG. 2 includes an arrangement of computer hardware and software modules that may be used to implement aspects of the present disclosure. The hardware modules may be implemented with physical electronic devices, as discussed in greater detail below. The coordinator 114 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the coordinator 114 includes a processing unit 204, a network interface 206, a computer readable medium drive 207, and an input/output device interface 208, all of which may communicate with one another by way of a communication bus. The network interface 206 may provide connectivity to one or more networks or computing systems. The processing unit 204 may thus receive information and instructions from other computing systems or services via the network 104. The processing unit 204 may also communicate to and from memory 250 and further provide output information for additional resources via the input/output device interface 208. The input/output device interface 208 may also accept input from the additional resources.

The memory 250 may contain computer program instructions (grouped as modules in some embodiments) that the processing unit 204 executes in order to implement one or more aspects of the present disclosure. The memory 250 generally includes random access memory (RAM), read only memory (ROM) and/or other persistent, auxiliary or non-transitory computer readable media. The memory 250 may store an operating system 252 that provides computer program instructions for use by the processing unit 204 in the general administration and operation of the coordinator 114. The memory 250 may further include computer program instructions and other information for implementing aspects of the present disclosure. For example, in one embodiment, the memory 250 includes a resource manager 254, a scheduler 256, a deployment agent 258, and a communication manager 260.

The scheduler 256 and deployment agent 258 may be executed by the processing unit 204 to select tasks for execution by the processing unit 204, and to manage such task executions. Specifically, the scheduler 256 may include instructions to select a tasks for execution at given points in time and to suspend execution of tasks (e.g., under instances of constrained resources at the coordinator 114). The deployment agent 258 may include instructions to select an appropriate execution environment 270 in which to execute a task, to provision that execution environment 270 with appropriate access to resources needed during the task execution, and to cause execution of the task within the execution environment 270. An execution environment 270, as used herein, refers to a logical portion of memory 250 in which to execute a task. In one embodiment, execution environments 270 are programmatically separated, such that execution of code in a first execution environment 270 is prohibited from modifying memory associated with another execution environment 270. Illustratively, an execution environment 270 may correspond to a "container," operating-system-level virtualization environment, or "sand box" environment, such as a "chroot jail" or a Python virtual environment "virtualenv." In other instances, an execution environment 270 may correspond to a virtual machine environment (e.g., a JAVA virtual machine, a virtualized hardware device with distinct operating system, etc.). In still other instances, an execution environment 270 may be a memory space allocated to an execution of a task, without necessarily utilizing virtualization.

Communications between tasks executing on the coordinator, as well as between the coordinator 114 and other devices (e.g., service provider execution environment 120 and coordinated devices 112) may be facilitated by the communication manager 260. Specifically, the communication manager 260 may be configured to obtain messages directed to the coordinator 114 and forward the message to the appropriate destination. For example, the communication manager 260 may route messages between any combination of tasks, coordinated devices 112, and devices of the service provider execution environment 120 (FIG. 1).

To enable gathering of information regarding operation of the coordinator 114, the memory 250 further includes a metrics and logging agent 259, corresponding to code executable by the coordinator 114 to monitor operation of the coordinator 114, such as how tasks are executed at the coordinator 114, and to report information regarding such operation. The information may include, for example, execution times of tasks on the coordinator 114, as well as information regarding such executions (e.g., compute resources used, whether the execution resulted in an error, etc.). In some instances, the metrics and logging agent 259 may store this information locally, such as in the memory 250, to enable a user to obtain the information. In other instances, the metrics and logging agent 259 agent may store the information remotely, such as at the service provider environment 120. The metrics and logging agent 259 may also implement additional functionality with respect to monitoring operation of the coordinator 114, such as transmitting health check data from the coordinator 114 to the service provider environment 120.

Tasks executed by the coordinator 114 are shown as logically grouped within the tasks memory space 280, which may correspond to a logical unit of memory 250 configured to store the code corresponding to each task. As shown in FIG. 2, the tasks memory space 280 can include a number of tasks executable by the processing unit 204 to implement functionalities of the coordinator 114, including a router task 282, one or more communication manager tasks 286, a shadow service task 288, and one or more client-provided tasks 290.

The router task 282 may correspond to a portion of code executable to assist in the routing of messages within, to, and from the coordinator 114. In one embodiment, the router task 282 implements an "event flow table" to determine appropriate destinations for a message or other indications of events received at the coordinator 114. For example, the communication manager 260 may forward messages obtained at the coordinator 114 (e.g., due to generation by a task execution or reception at the input/output interface 208) to the router task 282, which may utilize the event flow table to determine that messages addressed to a certain identifier should be routed to a given task, a given client device 102, or a given coordinated device 102. In some instances, the event flow table may further be utilized to specify a manner of handling messages of a give type. For example, the event flow table may specify that messages or event data originating at a certain task or coordinated device 112 should be transmitted to another task or coordinated device 112, logged at the coordinator 114, disallowed, result in a new execution of a task, etc. The event flow table may further indicate that a message meeting specified criteria (e.g., addressed to a given identifier, including a specific flag, etc.) should be transmitted to the service provider environment 120 (e.g., on-demand code execution system 150). In one embodiment, the event flow table may utilize "topics" as identifiers, such that messages associated with a particular topic are transmitted according to a routing specified for that topic. The event flow table may further include information for how to route messages based on a source of those messages. For example, a message addressed to a given topic may be routed differently, based on whether the message is received from a first task, a second task, a first coordinated device 112, etc. By utilization of an event flow table, router task 282 can enable messages to be handled in different manners, without a change in the operation of a sender of such a message (e.g., without rewriting code for a task that generated the message, without modifying the software of a coordinated device 112 that generated the message, etc.).

The communication manager tasks 286 may enable communications between the coordinator 114 and a number of different external devices (e.g., coordinated devices 102) according to a protocol of such communications. For example, a first communication manager task 286 may be configured to manage communications using a BLUETOOTH™ protocol, a second communication manager may be configured to manage communications using an HTTP protocol, etc. In some instances, multiple communication manager tasks 286 may work collectively to implement communications. For example, a first communication manager task 286 may enable communications via the TCP protocol, while a second communication manager task 286 may enable communications via the MQTT protocol (which utilizes the TCP protocol and thus may utilize a first communication manager task 286). Because different communication manager tasks 286 can vary the ability of the coordinator 114 to communicate via different protocols, and because the tasks of the coordinator 114 may be altered via reconfiguration of the coordinator 114, the coordinator 114 can be rapidly reconfigured to utilize a variety of different communication protocols.

The shadow service task 288 can facilitate management and interaction with device shadows maintained at the coordinator 114. Illustratively, the shadow service task 288 can implement functionality similar to that provided by the device shadow service locally to the coordinator 114. Accordingly, the shadow service task 288 can maintain a shadow state (data representing a desired state) of a coordinated device 112, and allow for reading to or writing to such data. The shadow service task 288 can further enable synchronization of a coordinated device 112 with the device shadow for that device. Accordingly, by modifying a device shadow for a coordinated device 112, the state of the coordinated device 112 can be altered. By reading the device shadow for the coordinated device 112, the state of the coordinated device 112 can be determined. In some instances, the shadow service task 288 may further coordinate with another device shadow for a given device, such as a device shadow maintained by the device shadow service 140. For example, the shadow service task 288 may synchronize a local device shadow with a device shadow stored at the device shadow service 140, resolve conflicts between the local device shadow and the device shadow stored at the device shadow service 140, etc.

In addition to the tasks described above (each of which may illustratively be provided by an entity associated with the service provider environment 120), the tasks memory space 280 may include any number of client-provided tasks 290, which may correspond to executable code generated by a coordinated device (or other client device) and submitted to the service provider environment 120 for deployment to a coordinator 114. As such, functionalities provided by the client-provided tasks 290 may vary according to the desires of a submitting user. In some instances, the client-provided tasks 290 may be written in a coding language for which the memory 250 includes a language runtime. For example, where the coordinator 114 supports language such as node.js, Go, JAVA, and Python, the client-provided tasks 290 may include executable code written in any of those languages.

In addition, the memory 250 includes a configuration data portion 272, representing a logical portion of the memory 250 in which configuration data of the coordinator 114 is stored. The configuration data may include, for example, a current deployment version of the coordinator 114, data stored by the tasks of the task memory space 280, or other data used in the operation of the coordinator 114.

To enable configuration (and reconfiguration) of the coordinator 114, the memory 250 further includes a deployment agent 258. The deployment agent 258 can correspond to code executable to register a coordinator with the service provider environment 120, to determine a desired configuration of the coordinator 114, and in instances where a current configuration of the coordinator 114 does not match a desired configuration, to obtain configuration data for the coordinator 114 and modify the memory 250 to implement the desired configuration.

Figure 3A:
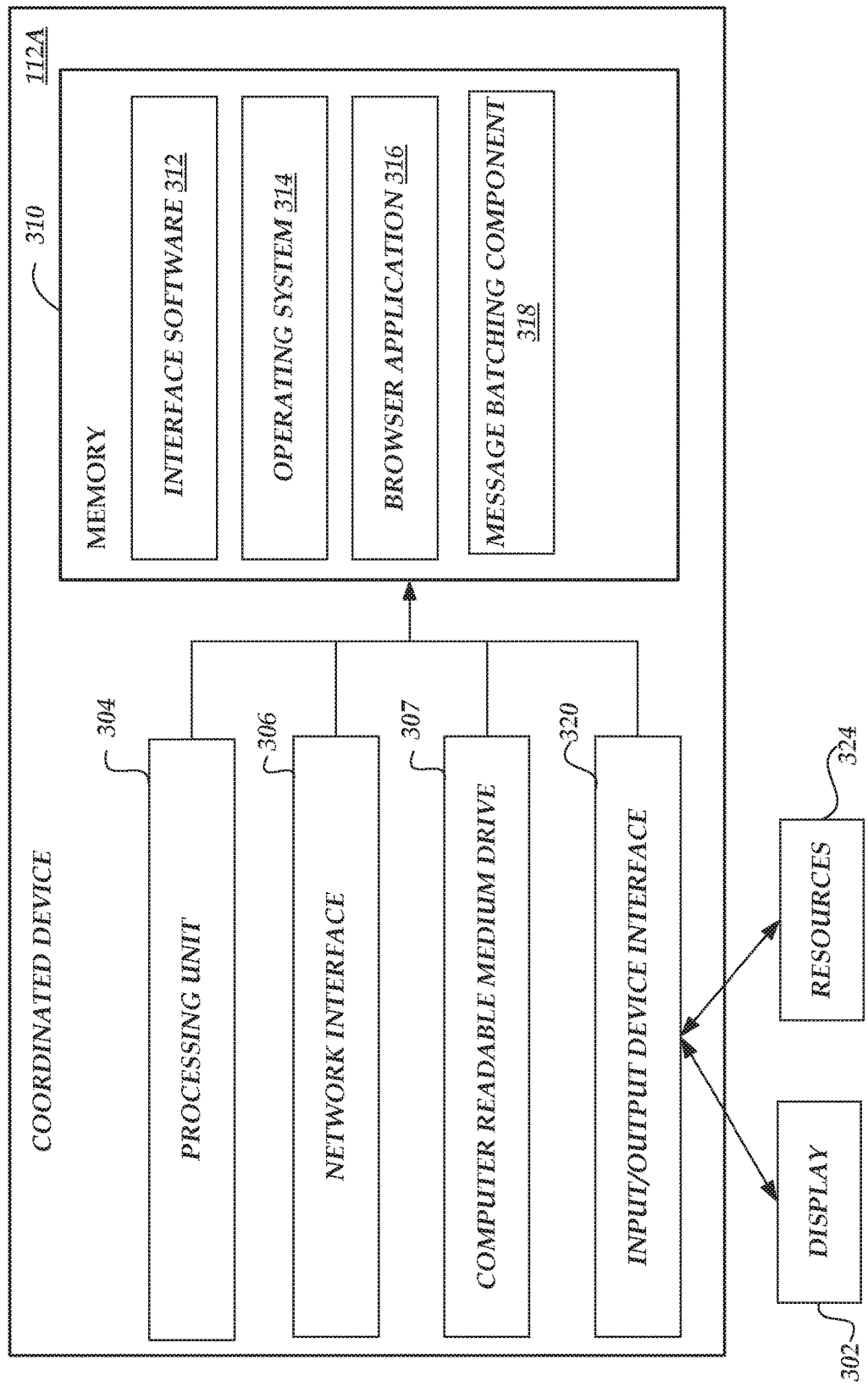
FIGS. 3A and 3B depict general architectures of coordinated devices managed by the coordinator of FIG. 1.

FIG. 3A depicts one embodiment of an architecture of an illustrative coordinated device 112A in accordance with the present application. The general architecture of the coordinated device 112A depicted in FIG. 3A includes an arrangement of computer hardware and software components that may be used to implement aspects of the present disclosure. As illustrated, the coordinated device 112A includes a processing unit 304, a network interface 306, a computer readable medium drive 307, an input/output device interface 320, an optional display 302, and an input/output device interface 320, all of which may communicate with one another by way of a communication bus. Illustratively, the coordinated device 112A may have more limited functionality and components as an embedded device, including inputs or outputs, as compared to a more generic computing device. Still further, in some embodiments, a single computing device may implement the functionality associated with the coordinator 114 and coordinated device 112.

The network interface 306 may provide connectivity to one or more networks or computing systems, such as the network 104 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from local resources 324, such as a specialized processor (e.g., graphics processing units), memory, optimized chipsets, etc. In some embodiments, the coordinated device 112A may include more (or fewer) components than those shown in FIG. 3A. For example, some embodiments of the coordinated device 112 may omit the display 302 and input/output device interface 320, while providing input/output capabilities through one or more alternative communication channel (e.g., via the network interface 306).

The memory 310 may include computer program instructions that the processing unit 204 executes in order to implement one or more embodiments. The memory 310 generally includes RAM, ROM or other persistent or non-transitory memory. The memory 310 may store an operating system 314 that provides computer program instructions for use by the processing unit 304 in the general administration and operation of the coordinated device 112A. The memory 310 may further include computer program instructions and other information for implementing aspects of the present disclosure. For example, in one embodiment, the memory 310 includes a browser application 316 for accessing content. Illustratively, the browser application 316 may encompass a full software browser application, portions of a browser application or simply be an interface software application (or executable instructions) that provide for data connectivity. In some embodiments, the memory 310 can further include a message batching component 318 configured to generate a set of messages corresponding to sub-portions of content. For example, the message batching component 318 can illustratively generate a set of sub-portions for content exceeding a message size maximum or based on other criteria. The message batching component 318 can further embedded sub-portion information in the individual sub-portion messages to facilitate transmission to and processing by the caching service 124.

Figure 3B:
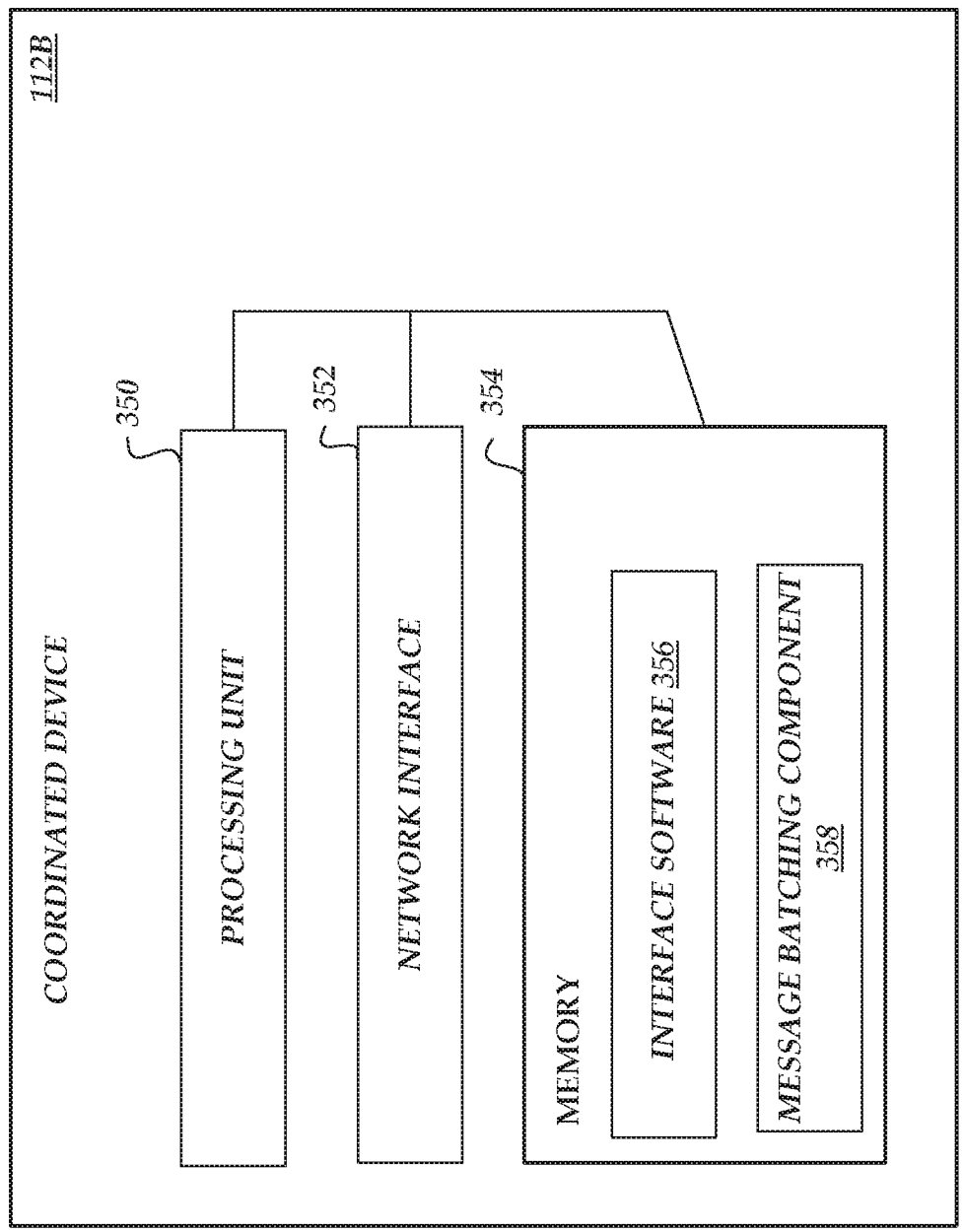

FIG. 3B depicts one embodiment of an alternative architecture of an illustrative coordinated device 112B in accordance with the present application. The general architecture of the coordinated device 112B depicted in FIG. 3B includes an arrangement of computer hardware and software components that may be used to implement aspects of the present disclosure. However, coordinated device 112B may be associated with a reduced set of components that may limit the computing functionality and operation of the coordinated device 112B. As illustrated, the coordinated device 112B includes a processing unit 350 and a network interface 352 that communicate with a communication bus. Unlike coordinated device 112B of FIG. 3A, the coordinated device 112B may not have a computer readable medium drive, an optional display, or an input device. However, for purposes of the present application, the coordinated device 112B will likely have some local resource that can be accessed during the execution of a task.

The network interface 352 may provide connectivity to one or more networks or computing systems, such as the network 104 of FIG. 1. The processing unit 350 may thus receive information and instructions from other computing systems or services via a network. The memory 354 may include computer program instructions that the processing unit 350 executes in order to implement one or more embodiments. The memory 354 generally includes RAM, ROM or other persistent or non-transitory memory. In this embodiment, the memory 354 may store a full operating system that provides computer program instructions for use by the processing unit 350 in the general administration and operation of the coordinated device 112B. Rather, in one embodiment, the memory 354 includes an interface software component 356 for accessing receiving and processing instructions. In some embodiments, the memory 354 can further include a message batching component 358 configured to generate a set of messages corresponding to sub-portions of content. The message batching component 358 can further embedded sub-portion information in the individual sub-portion messages to facilitate processing by the caching service 124.

Figure 4:
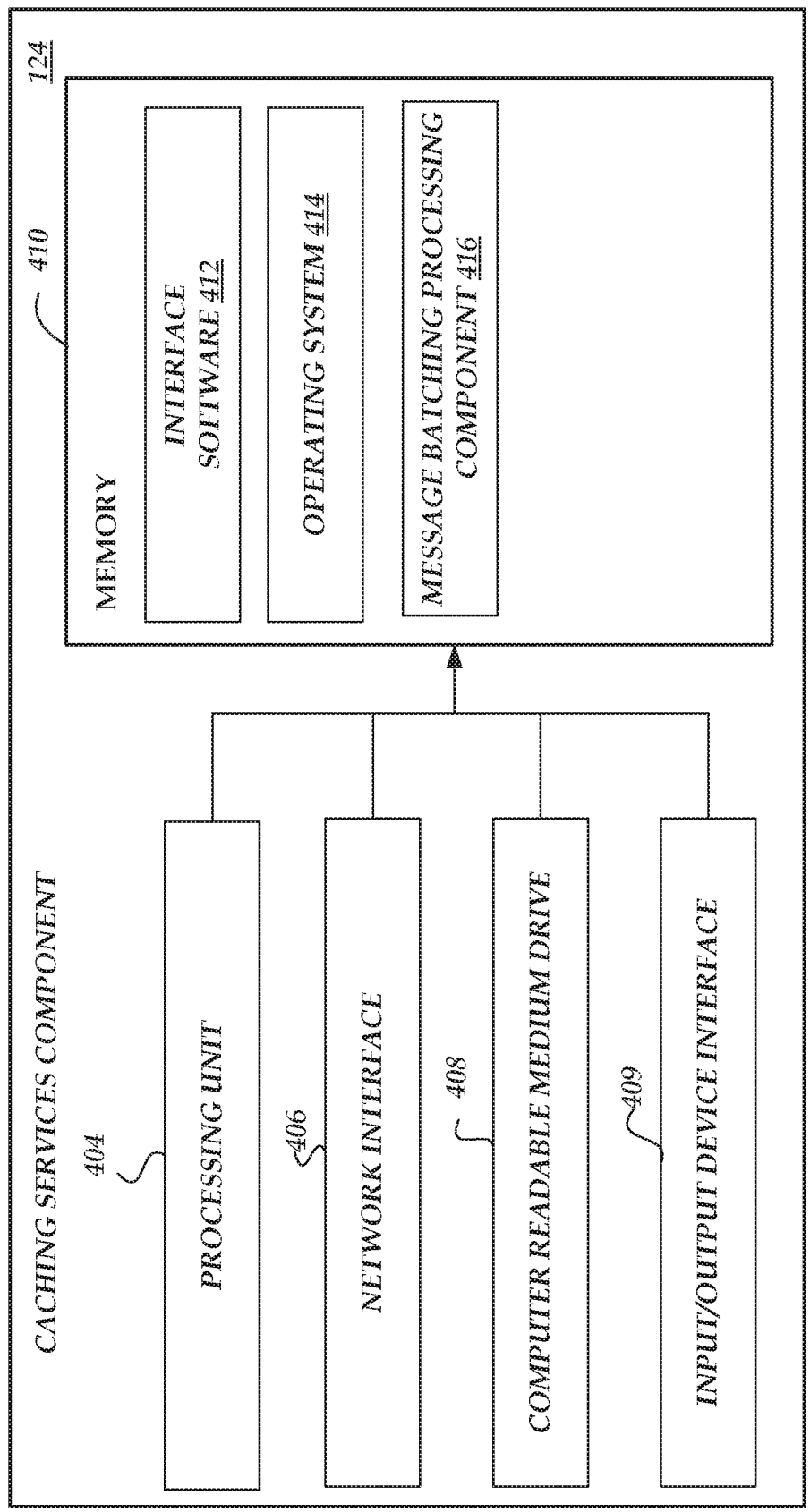
FIG. 4 depicts a general architecture of a caching service component for implementing one or more aspects of the present application.

FIG. 4 depicts one embodiment of an architecture of an illustrative computing device for implementing various aspects of the caching services component 124 in accordance with aspects of the present application. The caching services component 124 can be a part of the instantiation of a set of virtual machine instances associated with a caching layer available to the service provider environment 120. Alternatively, the computing device may be a stand-alone device that forms, or otherwise functions as, the caching services component 124.

The general architecture of the caching services component 124 depicted in FIG. 4 includes an arrangement of computer hardware and software components that may be used to implement aspects of the present disclosure. As illustrated, the computing device 400 includes a processing unit 404, a network interface 406, a computer readable medium drive 408, an input/output device interface 409, all of which may communicate with one another by way of a communication bus. The components of the computing device 400 may be physical hardware components or implemented in a virtualized environment.

The network interface 406 may provide connectivity to one or more networks or computing systems, such as the network of FIG. 1. The processing unit 404 may thus receive information and instructions from other computing systems or services via a network. The processing unit 404 may also communicate to and from memory 410 and further provide output information. In some embodiments, the computing device 400 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the caching services component 124. The memory 410 may further include computer program instructions and other information for implementing aspects of the present disclosure. For example, in one embodiment, the memory 410 includes interface software 412 for receiving and processing batched messages from coordinated devices 112 or coordinators 114. Memory 410 includes a message batching processing component 416 for processing the set of sub-portions to determine when a complete transmission of content has been received and is ready for transmission to a recipient device as described herein.

As specified above, in one embodiment, the caching services component 124 illustrated in FIG. 4 can be implemented as physical computing devices or virtualized computing devices in a computing network. In another embodiment, the caching services component 124 may be implemented as logical components in a virtual computing network in which the functionality of the caching services component 124 is implemented by an underlying substrate network of physical computing devices. Thus, aspects of the present application should not be limited to interpretation requiring a physical, virtual or logical embodiment unless specifically indicated as such.

Figure 5A:
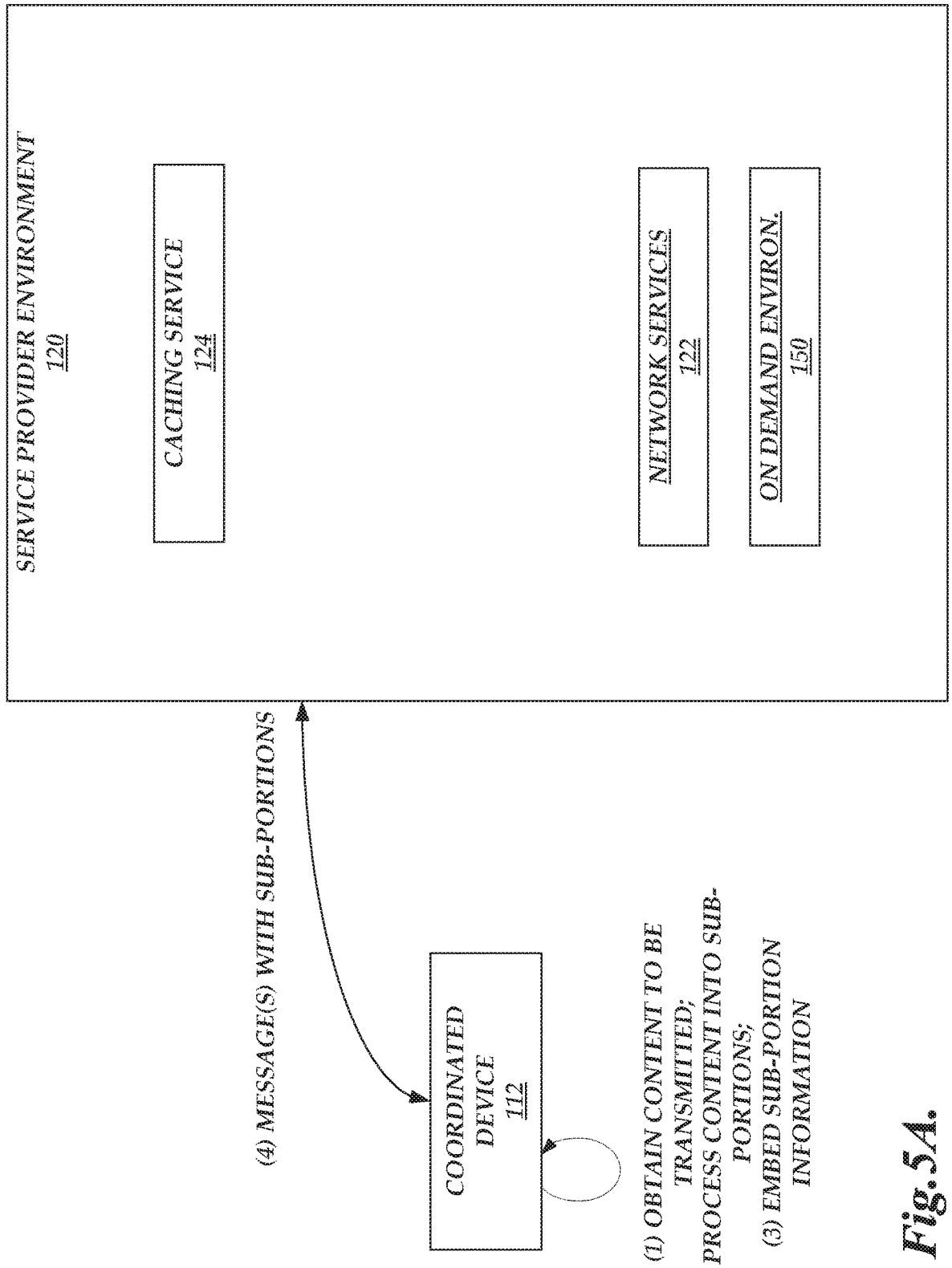
FIGS. 5A and 5B are block diagrams of the illustrative embodiment of FIG. 1 illustrating the transmission on content as a set of sub-portions in accordance with a message protocol.
Figure 5B:
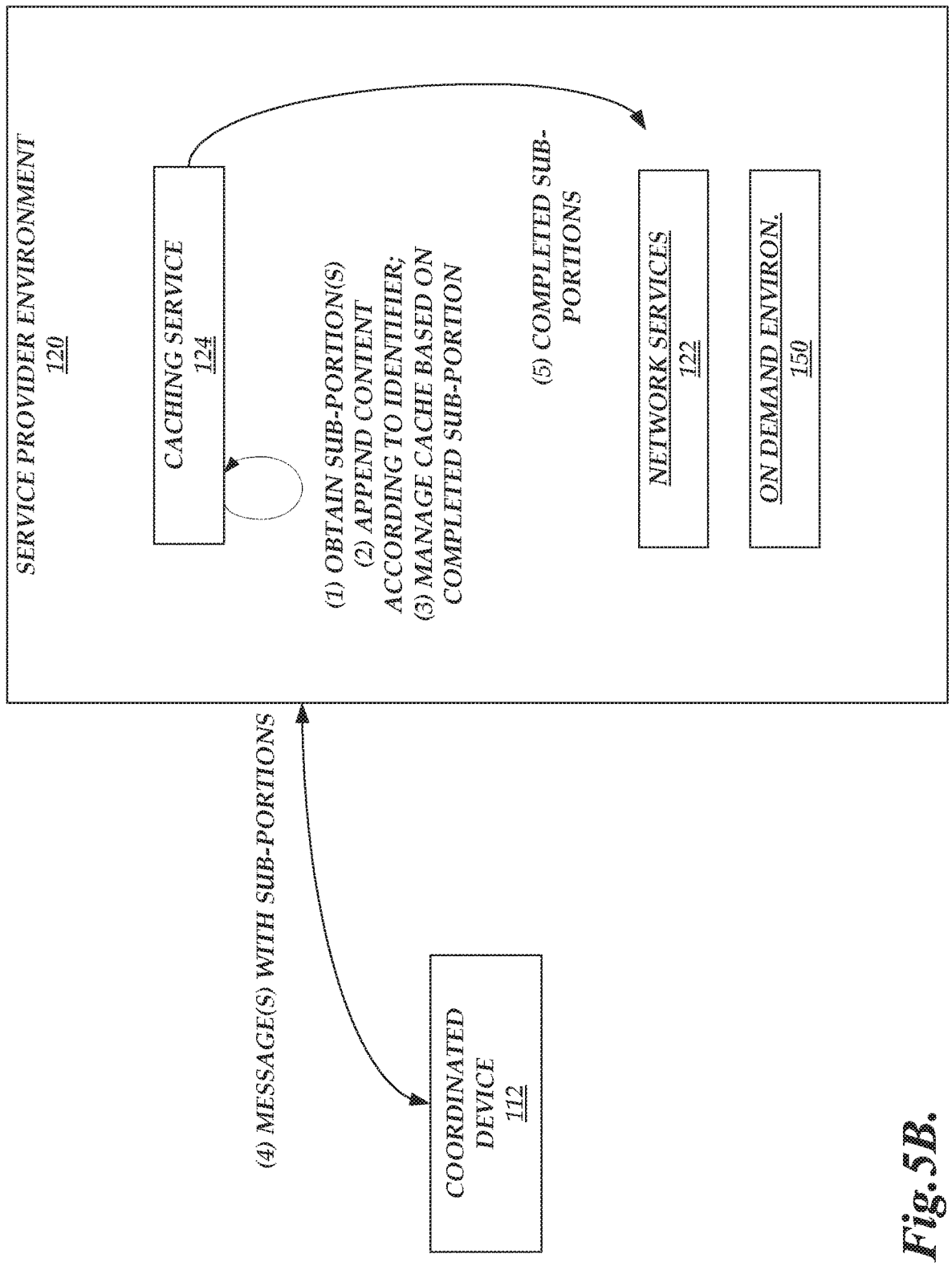

FIGS. 5A and 5B are block diagrams of the illustrative embodiment of the environment 100 of FIG. 1 illustrating the transmission of content as a set of sub-portions in accordance with a message protocol. With reference now to FIG. 5A, at (1), the coordinated device 112 obtains content to be transmitted to a recipient device. Illustratively, in a messaging protocol, such as MQTT, content is transmitted in a message format. The message format includes a first portion, generally referred to as a header, that identifies information related to a message. The header information, can include a topic, that is utilized to route the message to one or more recipients. For example, individual recipients may be registered to receive messages published according to selected topics. The header information does not necessarily include a direct recipient identifier to receive the information in some embodiments. In other embodiments or variations, the header information can include recipient information. The message format can further include a second portion, generally referred to as a payload, that corresponds to content to be transmitted as part of the message. The payload can include any variety of data, including, but not limited to, images, videos, textual information, graphical information and the like to be received by one or more network services 122. Additionally, as described above the payload can correspond to tasks or other executable code for the on-demand code execution environment 150.

At (2), the coordinated device 112 processed the content into sub-portions. Illustratively, in one embodiment, the coordinated device 112 determines whether the message exceeds a message size maximum or threshold. The message size maximum represents a maximum size or threshold size that is permitted for one or more portions of a message to be transmitted in the network 104 in accordance with the messaging protocol. The message size maximum can be specified or established as part of the messaging protocol, such as in MQTT. The messaging size maximum can also be adjusted based on network or system configurations, such as a messaging size maximum adjusted from a threshold specified in the protocol. As discussed above, in one embodiment, the messaging size maximum in an MQTT messaging protocol can correspond to 256 MB for the payload portion. In another embodiment, the coordinated device 112 can determine to associate the content to be transmitted into sub-portions based on other criteria that may be independent of payload size. For example, the coordinated device 112 can determine that the content is associated with a specified transmission category that requires division of the payload into sub-portions or priority that specifies that the content should be divided and transmitted as a set of messages instead of a single message. Still further, in another embodiment, the coordinated device 112 can coordinate or be coordinated with other coordinated devices to transmit sub-portions of the payload in parallel. In such embodiments, a set of coordinated devices may redundantly transmit the sub-portions to the caching service or caching layer. Alternatively, the set of coordinated devices may allocate different sub-portions or only partially overlapping sub-portions for transmission in parallel or asynchronously.

At (3), the coordinated device 112 generates and embeds sub-portion information. Illustratively, the sub-portion information corresponds to information that can be utilized by a caching service or caching layer to process a transmitted set of messages including sub-portions of the content (e.g., sub-portion messages). In a first aspect, the sub-portion information can include a content identifier that will be utilized to identify each of the sub-portion messages and that will function as a key or identifier for the caching service. The content identifier can correspond to a hash of at least a portion of the content. In another embodiment, the content identifier is a unique identifier provided by the computing device. The sub-portion information can also indicate the number of sub-portions that form the content. Finally, the sub-portion information includes an associated order for each individual sub-portion. With reference to the previous example, for the 1000 MB file, the sub-portion information would include the content identifier (e.g., a hash) for all the sub-portion, an indication that the content was subdivided into four sub-portions and an identification of the order (e.g., 1, 2, 3, or 4) of the individual sub-portion.

At (4), the computing device transmits the sub-portion message with the embedded information. As described above, the act of transmission in accordance with the MQTT messaging protocol can include a number of interactions and specific components. In one embodiment, the coordinated device 112 can transmit each individual message in sequence as the content is divided and the sub-portion information is embedded in the header of each respective message. In other embodiments, the coordinated device 112 can queue messages to be delivered and attempt to transmit in a batch form or attempt to transmit messages in parallel to different individual caching components forming the caching service 124. For example, if the caching service component 124 includes multiple caching components that can receive individual messages, the coordinated device 112 can selectively or redundantly transmit the messages to a plurality of caching components. Still further in other embodiments, the coordinated device 112 can transmit multiple copies of individual messages to the caching service 124 to ensure that at least one copy is received. As will be described below, the caching service 124 can discard duplicate messages that are received from a coordinated device 112 or set of coordinated devices (if working in collaboration). The coordinated device 112 can address specific caching components of the caching service 124 or transmit the messages to a gateway component for distribution/load balancing by the caching service 124. For parallel transmissions, the caching service 124 can provide routing or addressing information to the coordinated device 112 to facilitate multiple transmissions.

With reference to FIG. 5B, the processing of content to be transmitted to a recipient will be described. At (1), the caching service component 124 (individually or collectively) receives the content and parses the sub-portion message to identify sub-portion information. As described above, in a messaging protocol, such as MQTT, content is transmitted in a message format. The message format includes a first portion, generally referred to as a header, that identifies information related to a message. The header information can include the sub-portion information previously embedded by the computing device. The sub-portion information can include a content identifier that will be utilized to identify each of the sub-portion messages and that will function as a key or identifier for the caching service. The content identifier can correspond to a hash of at least a portion of the content. In another embodiment, the content identifier is a unique identifier provided by the computing device. The sub-portion information can also include the determined number sub-portions that form the content. Finally, the sub-portion information includes an associated order for each individual sub-portion.

At (2), the caching service component 124 appends the payload/message in the cache. Illustratively, the caching service component 124 or caching layer can correspond to a distributed network in which multiple computing devices collectively function as the caching service and may individually receive one or more of the sub-portion messages. In such embodiments, the computing devices can sync the key information and appended information (or pointers). Additionally, in other embodiments, the caching service may correspond to any file or data storage type in which data may be stored using a unique identifier as a key. As described above, in some embodiments, the caching service component 124 may receive multiple transmissions in parallel that can be received by different computing devices forming the caching service component 124 and which can store the received data in a collective manner. The caching service component 124 can provide a gateway function that facilitates distribution and processing of incoming messages by different computing devices, such as a round-robin distribution or a hash-based distribution. The transmissions may be received from a single coordinated device or set of coordinated devices.

At (3), the coordinated device 112 determines whether all sub-portions have been received. Illustratively, the caching service component 124 will compare the number of received sub-portion messages to the calculated number of sub-portion messages embedded in the header information. If the number of received sub-portion messages matches the sub-portion information identifying the expected total number of sub-portions, at (5), the caching service component 124 processes the complete set of sub-portions. In one embodiment, the caching service component 124 can forward the completed sub-portions to the intended recipients without reassembling the sub-portions into the complete content. In another embodiment, the caching service component 124 may process the individual sub-portions to reassemble the complete content and then forward the complete content to the intended recipient.

If all the completed sub-portions have not been received, the coordinated device 112 determines whether timing information associated with the cached sub-portions has expired. Illustratively, the timing information can correspond to time to live ("TTL") information utilized in the management of cache entries. The TTL can be set based on business rules or requirements. In this aspect, the TTL corresponds to an amount of time that the caching service component 124 will wait to receive all the sub-portions once the initial sub-portion message is received. As illustrated at (4), the coordinated device 112 can continue to transmit or re-transmit messages. If the additional sub-portions are received before the TTL expires, the cached message remains valid. Alternatively, if the TTL expires, the caching service component 124 does not continue to wait for lost or significantly delayed messages. In this embodiment, the caching service component 124 processes the expired cache. For example, the caching service component 124 can delete the received sub-portions that only form a partial version of the payload or otherwise designate the cached sub-portions as stale or unusable. In other example, the caching service component 124 can utilize the expiration of the cache to request retransmission of the missing sub-portions prior to deletion. Other altering or notifications may also be generated by the caching service component 124. However, in one aspect, by utilizing timing criteria in conjunction with the embedded information, the caching service component 124 addresses the deficiencies associated with simplified chunking or batching algorithms as described.

Figure 6:
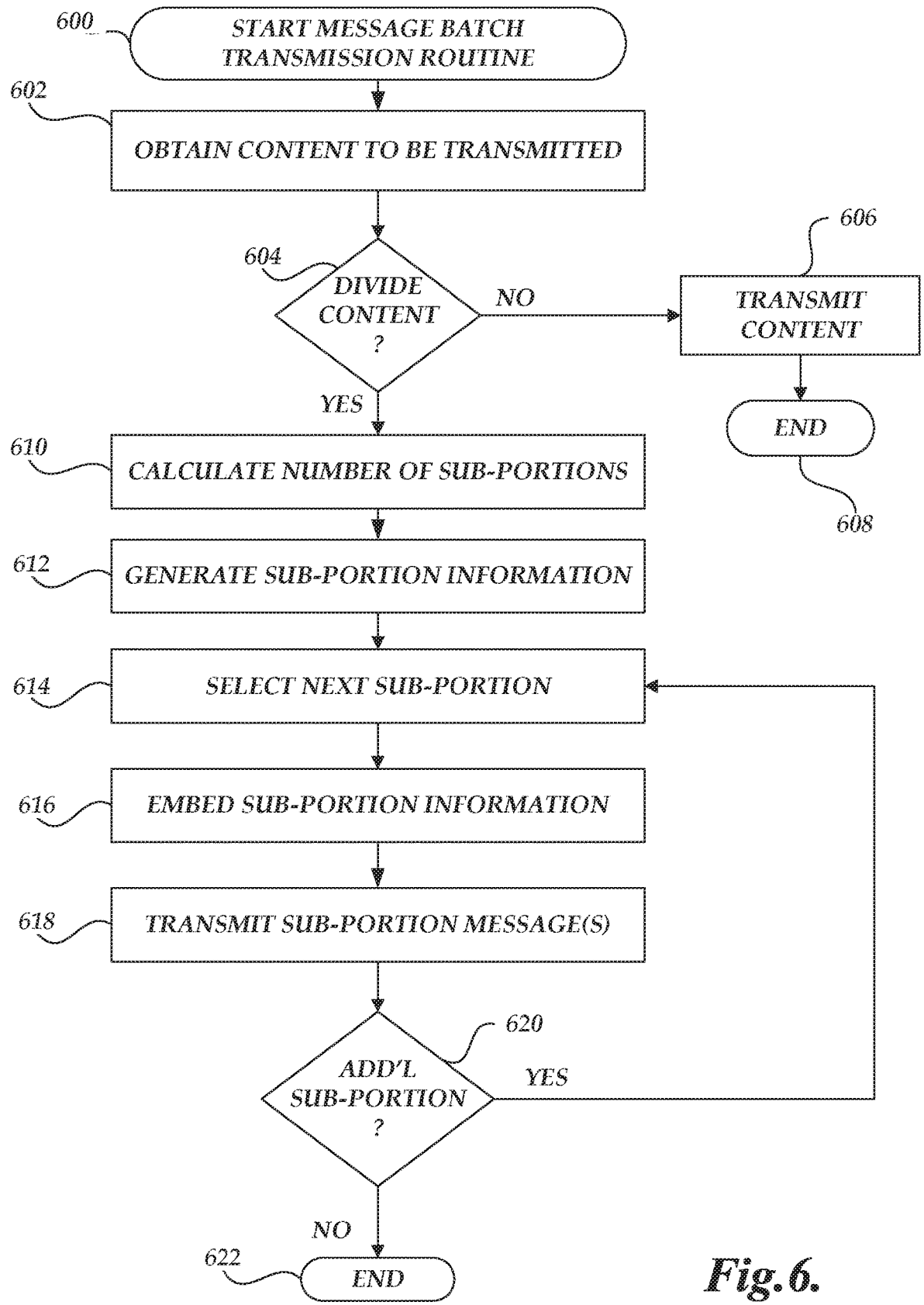
FIG. 6 is flow diagram depicting illustrative interactions for a message batch transmission routine in accordance with aspects of the present application.

With reference now to FIG. 6, a message batch transmission routine 600 for the processing of content to be transmitted to a recipient will be described. Illustratively, routine 600 may be implemented by a computing device, such as a coordinated device 112 or coordinator 114 for the transmission of data in accordance with a message protocol, such as the topic-based MQTT protocol. Accordingly, routine 600 will be described with regard to implementation by a computing device. The recipient of the message(s) may be a network service 122 or on-demand code execution service 150 and will not be separately described. At block 602, the computing device obtains content to be transmitted to a recipient device. Illustratively, in a messaging protocol, such as MQTT, content is transmitted in a message format. The message format includes a first portion, generally referred to as a header, that identifies information related to a message. The header information, can include a topic, that is utilized to route the message to one or more recipients. For example, individual recipients may be registered to receive messages published according to selected topics. The header information does not necessarily include a direct recipient identifier to receive the information in some embodiments. In other embodiments or variations, the header information can include recipient information. The message format can further include a second portion, generally referred to as a payload, that corresponds to content to be transmitted as part of the message. The payload can include any variety of data, including, but not limited to, images, videos, textual information, graphical information and the like to be received by one or more network services 122. In other embodiments, the payload can include tasks to be executed by the on-demand code execution environment 150. One skilled in the relevant art will appreciate that transmission of messages in accordance with messaging protocols, such as the MQTT protocol, can include additional components or processing steps to facilitate transmission of the messages over a network, such as network 104, but will not be described in greater detail.

At decision block 604, the computing device determines whether to divide the received content. In one embodiment, the determination of whether to divide the received content is based on whether the message exceeds a message size maximum or threshold. Illustratively, the message size maximum represents a maximum size or threshold size that is permitted for one or more portions of a message to be transmitted in the network 104 in accordance with the messaging protocol. The message size maximum can be specified or established as part of the messaging protocol, such as in MQTT. The messaging size maximum can also be adjusted based on network or system configurations, such as a messaging size maximum adjusted from a threshold specified in the protocol. As discussed above, in one embodiment, the messaging size maximum in an MQTT messaging protocol can correspond to 256 MB for the payload portion. In another embodiment, the determination of whether to divide can be based on additional or alternative criteria. For example, content may be configured with processing instructions or meta-data that instructs a coordinated device to implement sub-division of the content and the sub-division parameters. In another example, content may be designated with a priority or importance such that the coordinated device 112 can sub-divide to increase the likelihood or speed in which the entire content is received at the caching service component 124. Such a determination can further include the coordination or collaboration of multiple coordinated devices to transmit the content. In still another embodiment, the coordinated device 112 can examine network conditions, error rates, historical information, or the like to determine whether all or at least a portion of the messages should be divided. If the message including the content to be transmitted does not exceed the messaging size maximum or should be otherwise divided, at block 606, the computing device can transmit (or cause to transmit) the message in accordance with the messaging protocol (e.g., MQTT). At block 608, the routine 600 terminates. Illustratively, the computing device can directly transmit the message or indirectly transmit the messages via intermediary devices.

Returning to decision block 604, if the message including the content to be transmitted does exceed the messaging size maximum, at block 610, the computing device calculates a number of sub-portions. Illustratively, the computing device subdivides the content into equal portions based on a message transmission size. The message transmission size can be equal to or less than the messaging size maximum. The message transmission size may be set automatically based on an initial configuration of the computing device, e.g., a default value. In other embodiments, the message transmission size can be dynamically set based on network conditions, quality metrics, priorities and the like. For example, the computing device can select from multiple message transmission sizes based on selection criteria, such as historical quality measurements or measured performance. In another example, the content to be divided can include, or be associated with, meta-data that defines the message transmission size. Still further, the coordinated device 112 may select from different available message transmission sizes based on the type of transmissions to be attempted, such as multiple repeated transmissions or transmissions in parallel. In these embodiments, the message transmission size may be smaller than the messaging size maximum. The calculation of the number of sub-portions of the content by the message transmission size can simply correspond to a division of the total content size by the message transmission size. For example, a 1000 MB file could be divided into four sub-portions based on a 250 MB message transmission size.

At block 612, the computing device generates sub-portion information. Illustratively, the sub-portion information corresponds to information that will be utilized by a caching service or caching layer to process a transmitted set of messages including sub-portions of the content (e.g., sub-portion messages). In a first aspect, the sub-portion information can include a content identifier that will be utilized to identify each of the sub-portion messages and that will function as a key or identifier for the caching service. The content identifier can correspond to a hash of at least a portion of the content. In another embodiment, the content identifier is a unique identifier provided by the computing device. The sub-portion information can also include the determined number sub-portions that form the content. Finally, the sub-portion information includes an associated order for each individual sub-portion. With reference to the previous example, for the 1000 MB file, the sub-portion information would include the content identifier (e.g., a hash) for all the sub-portion, an indication that the content was subdivided into four sub-portions and an identification of the order (e.g., 1, 2, 3, or 4) of the individual sub-portion.

The computing device then enters into an iterative process for embedding the generation sub-portion information in individual sub-portions and transmitting the sub-portions (or preparing for transmission). The computing device can process the content to generate the sub-portions of the content for inclusion as payloads. At block 614, the computing device selects the next sub-portion in the set of sub-portion. At block 616, the computing device embeds the sub-portion information into the header portion of the individual sub-portion message. At block 618, the computing device transmits the sub-portion message with the embedded information. As described above, the act of transmission in accordance with the MQTT messaging protocol can include a number of interactions and specific components. In one embodiment, the computing device can transmit each individual message in sequence as the content is divided and the sub-portion information is embedded in the header of each respective message. In other embodiments, the computing device can queue messages to be delivered and attempt to transmit in a batch form or attempt to transmit messages in parallel to different individual caching components forming the caching service 124. Accordingly, block 618 may be removed from the loop and executed after a number of messages have been processed or a certain amount of time has expired. Still further in other embodiments, the computing device can transmit multiple copies of individual messages to the caching service 124 to ensure that at least one copy is received. As will be described below, the caching service 124 can discard duplicate messages that are received from a computing device. The computing device can address specific caching components of the caching service 124 or transmit the messages to a gateway component for distribution/load balancing by the caching service 124. For parallel transmissions, the caching service 124 can provide routing or addressing information to the computing device to facilitate multiple transmissions. For example, the computing device can use a hashing schema to distribute the transmission of a sequence of messages in a distributed manner (e.g., distributed the messages) to avoid message transmission issues, such as hot-spotting.

At decision block 620, a test is conducted to determine whether additional sub-portions still need to be processed. If so, the routine 600 returns to block 614 to select the next sub-portion in the set of sub-portions. Alternatively, once all the sub-portions have been processed, the routine 600 terminates at block 622. In some embodiments, the computing device may process all the sub-portions prior to transmitted, such as in a batched transmission. As described above, the computing device can transmit the set of messages to a single computing device associated with, or forming, the caching service component 124, a gateway device for routing to one of many computing devices forming the caching service component or directly to multiple computing devices forming the caching service component. The transmission of the messages may be implemented sequentially or parallel. Additionally, in embodiments, in which multiple coordinated devices are working in conjunction, individual coordinated devices may work synchronously in parallel to transmit sub-portions (overlapping or non-overlapping). Alternatively, the individual coordinated devices may execute routine 600 individually.

Figure 7:
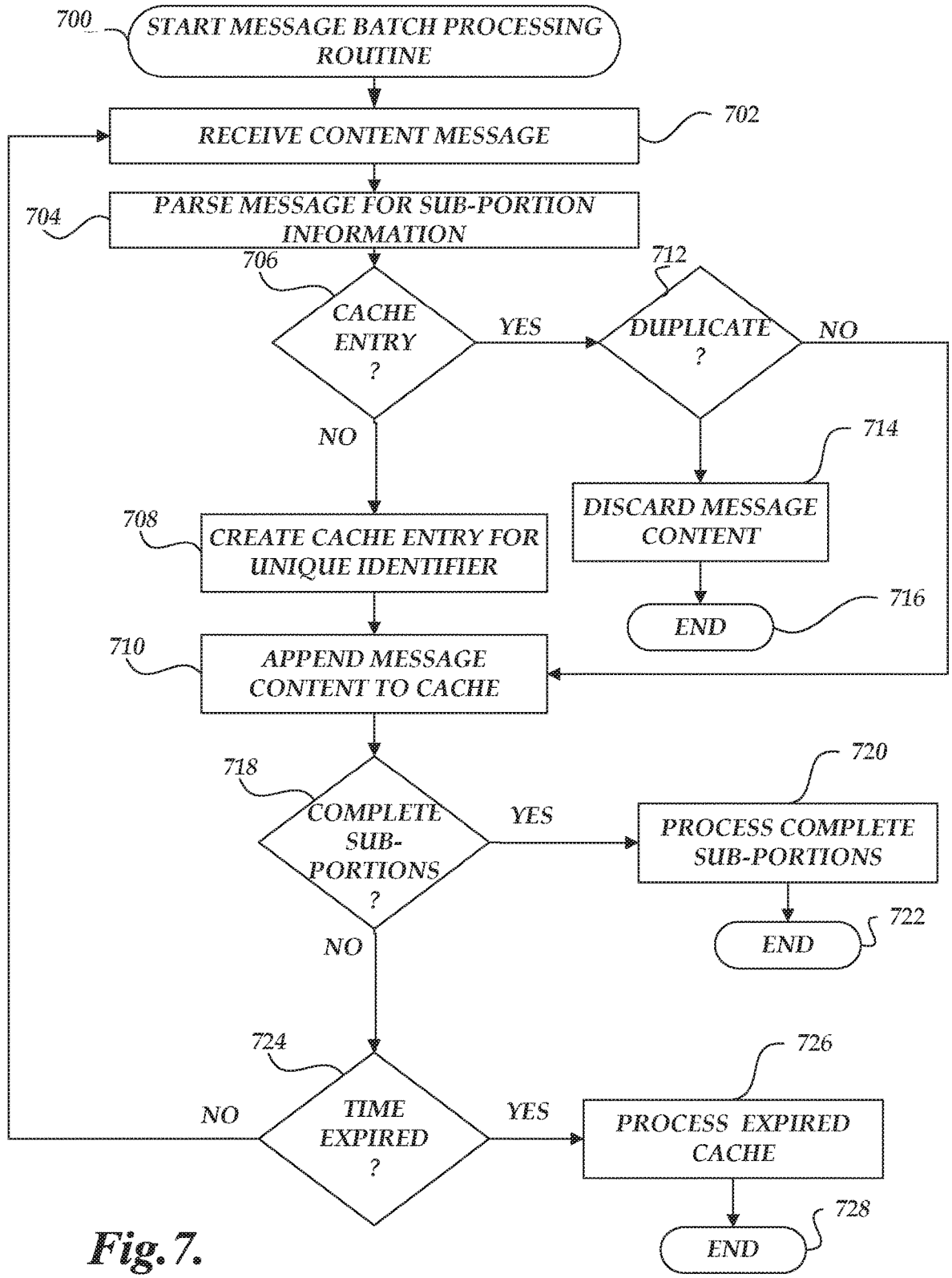
FIG. 7 is flow diagram depicting illustrative interactions for a message batch transmission routine in accordance with aspects of the present application.

With reference now to FIG. 7, a message batch processing routine 700 for the processing of content to be transmitted to a recipient will be described. Illustratively, routine 700 may be implemented by a computing device, such as a caching service component 124 or caching layer. At block 702, the caching service component 124 receives one or more sub-portion messages transmitted by a coordinated device 112 or coordinator 114. As described above, the receipt of the messages may be implemented by one or more computing devices forming the caching service component 124.

At block 704, the caching service component 124 parses the sub-portion message to identify sub-portion information. As described above, in a messaging protocol, such as MQTT, content is transmitted in a message format. The message format includes a first portion, generally referred to as a header, that identifies information related to a message. The header information can include the sub-portion information previously embedded by the computing device. The sub-portion information can include a content identifier that will be utilized to identify each of the sub-portion messages and that will function as a key or identifier for the caching service. The content identifier can correspond to a hash of at least a portion of the content. In another embodiment, the content identifier is a unique identifier provided by the computing device. The sub-portion information can also include the determined number sub-portions that form the content. Finally, the sub-portion information includes an associated order for each individual sub-portion.

At decision block 706, a test is conducted to determine whether an entry in the cache already exists. As described above, the caching service component 124 caches individual sub-portions using the content identifier as a key for all the sub-portions. Illustratively, utilizing a common identifier for the set of sub-portions facilitates the collection and management of the sub-portions, including the distributed transmission of sub-portion messages by a computing device. If an entry in the cache does not already exist (e.g., this is the first received sub-portion message or all previously received portions are no longer considered valid), at block 708, the caching service component 124 creates a new cache entry based on the unique identifier. At block 710, the caching service component 124 appends the payload/message in the cache. Illustratively, the caching service component 124 or caching layer can correspond to a distributed network in which multiple computing devices collectively function as the caching service and may individually receive one or more of the sub-portion messages. In such embodiments, the computing devices can sync the key information and appended information (or pointers). Additionally, in other embodiments, the caching service may correspond to any file or data storage type in which data may be stored using a unique identifier as a key.

Returning to decision block 706, if an entry in the cache already exists at decision block 712, a test is conducted to determine whether the receive sub-portion message is duplicative. Illustratively, the caching service component 124 can utilize the embedded information that identifies the order of the sub-portion message to determine duplicative entries. For example, if a sub-portion message is identified as the second sub-portion of four sub-portions and the cache already has an entry for the second sub-portion, the received sub-portion message is considered duplicative. In other embodiments, the caching service component 124 can implement data matching or content matching algorithms/services to make the determination. If the received message is duplicative (or characterized as duplicative), the received message is discarded at block 714 and the routine 700 terminates at block 716 or waits to receive the next sub-portion message. As previously described, in some embodiments, the computing device (such as a coordinated device 112) can transmit multiple copies of the same message in order to increase the likelihood that the message is received, including directing multiple copies of the message to different computing devices forming the caching service component 124. Accordingly, the caching service component 124 can delete or discard the received duplicate once a first copy is received and processed as described herein.

If at decision block 712, the received sub-portion message is not duplicative, the routine 700 proceeds to block 710, where the received message is appended to the cache. In this aspect, since an entry already exists in the cache for the unique identifier, the caching service component 124 adds the payload portion and the order information to the cache and updates a count of the number of received sub-portions. As described herein, the caching service component 124 can maintain the received sub-portions of the payload until all the sub-portions have been received or some timing event occurs.

At decision block 718, a test is conducted to determine whether all sub-portions have been received. Illustratively, the caching service component 124 will compare the number of received sub-portion messages to the calculated number of sub-portion messages embedded in the header information. If the number of received sub-portion messages matches the sub-portion information identifying the total number of sub-portions to be transmitted, at block 720, the caching service component 124 processes the completed set of sub-portions. In one embodiment, the caching service component 124 can forward the completed sub-portions to the intended recipients. In another embodiment, the caching service component 124 may process the individual sub-portions to form the completed content and then forward the complete content to the intended recipient. The routine 700 terminates at block 722.

If all the completed sub-portions have not been received, at decision block 724 a test is conducted to determine whether timing information associated with the cached sub-portions has expired. Illustratively, the timing information can correspond to time to live ("TTL") information utilized in the management of cache entries. The TTL can be set based on business rules or requirements. In this aspect, the TTL corresponds to an amount of time that the caching service component 124 will wait to receive all the sub-portions once the initial sub-portion message is received. If the additional sub-portions are received before the TTL expires, the cached message remains valid and the routine 700 returns to block 702. Alternatively, if the TTL expires, the caching service component 124 does not continue to wait for lost or significantly delayed messages. In this embodiment, the caching service component 124 processes the expired cache at block 726, such as by deleting the data or designated the data as invalid. In other embodiments, the caching service component 124 can request a retransmission of the missing or omitted sub-portions prior to deleting the cached messages. The caching service component 124 can make further notifications or alerts in response to expiration of the cached data or other transmit the partial set of messages to a recipient if specified or requested. Routine 700 terminates at block 728.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for transmission of content via a messaging protocol, the system comprising:
   one or more first computing devices configured to execute an interface for communicating information in accordance with a topic-based messaging protocol, wherein the topic-based messaging protocol is associated with a message size maximum, wherein individual computing devices of the one or more first computing devices are configured to:
  obtain content to be transmitted to at least one recipient device;
  determine whether the content to be transmitted exceeds the message size maximum;
  responsive to a determination that the content to be transmitted exceeds the message size maximum, calculate a set of sub-portions for the content to be transmitted based on a message transmission size;
  determine a content identifier for the calculated set of sub-portions;
  for individual sub-portions of the calculated set of sub-portions, embed sub-portion information corresponding to the determined content identifier, a number indicative of a quantity of sub-portions in the calculated set of sub-portions, and an associated order for the individual sub-portion within the calculated set of sub-portions; and
  transmit the set of sub-portions as individual messages over a network; and
one or more second computing devices configured to execute an interface for receiving information in accordance with a topic-based messaging protocol, wherein the one or more second computing devices form a caching service and are configured to:
  receive, via the network, one or more messages from the one or more first computing devices;
  parse the received one or more messages to identify embedded sub-portion information;
  cache the received one or more messages based on an identifier included in the embedded sub-portion information;
  responsive to a determination that a full set of sub-portion messages has been cached:
    process the full set of sub-portion messages to form the content to be transmitted to the at least one recipient computing device; and
    transmit the content to the at least one recipient computing device; and
  responsive to a determination that a full set of sub-portion messages has not been cached:
    determine whether a time-to-live criterion for cached sub-portion messages has expired; and
    responsive to a determination that the time-to-live criterion for the cached sub-portion messages has expired, discard the cached sub-portion messages.

2. The system of claim 1, wherein the message size maximum is equal to the message transmission size.

3. The system of claim 1, wherein the one or more second computing devices implementing the caching service are further configured to determine whether a duplicate sub-portion has been received.

4. The system of claim 1, wherein the one or more first computing devices correspond to a coordinator configured to transmit messages on behalf of coordinated devices in a coordinated network.

5. The system of claim 1, wherein the topic-based messaging protocol corresponds to MQ Telemetry Transport messaging protocol.

6. A computer-implemented method to manage transmission of data in accordance with a topic-based messaging protocol, the method comprising:
  obtaining, by a transmitting computing device, content to be transmitted via the topic-based messaging protocol;
  determining whether the content to be transmitted should be divided based at least on a transmission category associated with the content;
  responsive to a determination that the content to be transmitted should be divided into a set of sub-portion messages, embedding sub-portion information in individual sub-portions of the set of sub-portion messages corresponding to the content to be transmitted, wherein a number of the set of sub-portion messages is determined based on a message transmission size, and wherein the sub-portion information embedded in the individual sub-portions includes a content identifier, the number of the set of sub-portion messages, and an associated order of the individual sub-portion within the set of sub-portion messages; and
  transmitting, by the transmitting computing device via a network, individual sub-portions of the set of sub-portion messages as individual messages in accordance with a messaging protocol, wherein the messaging protocol implements a message size maximum and wherein the message transmission size is equal to or less than the message size maximum, and wherein transmitting the individual sub-portions of the set of sub-portion messages causes a receiving computing device to:
    responsive to a determination based at least in part on the sub-portion information embedded in received individual sub-portions that a full set of sub-portion messages has been received, process the full set of sub-portion messages to form the content; and
    responsive to a determination based on the sub-portion information that a full set of sub-portion messages has not been received and a determination that a time-to-live criterion has expired, discard the one or more of the individual sub-portions.

7. The computer-implemented method of claim 6 further comprising determining that the content to be transmitted should be divided based on a size associated with the content exceeding the message size maximum.

8. The computer-implemented method of claim 6 further comprising determining that the content to be transmitted should be divided based on criteria independent of a size associated with the content.

9. The computer-implemented method of claim 6, wherein the content identifier comprises a unique identifier associated with the set of sub-portion messages.

10. The computer-implemented method of claim 9, wherein the unique identifier corresponds to a hash of at least a portion of the content to be transmitted.

11. The computer-implemented method of claim 9, wherein the unique identifier corresponds to a unique identifier assigned to the content to be transmitted.

12. The computer-implemented method of claim 6, wherein the message transmission size is less than the message size maximum and is specified by a network policy.

13. The computer-implemented method of claim 6 further comprising dynamically modifying the message transmission size.

14. The computer-implemented method of claim 6, wherein transmitting the individual sub-portions of the set of sub-portion messages as individual messages in accordance with a messaging protocol includes transmitting a set of messages in parallel.

15. The computer-implemented method of claim 6, wherein transmitting the individual sub-portions of the set of sub-portion messages as individual messages in accordance with a messaging protocol includes transmitting a plurality of copies of individual messages.

16. The computer-implemented method of claim 6, wherein determining whether the content to be transmitted should be divided based at least on a transmission category associated with the content includes determining whether the content should be sent as a single message or a set of messages based on the transmission category.

17. A non-transitory computer-readable storage medium storing instructions to manage transmission of data in accordance with a topic-based messaging protocol, the instructions, when executed by a processor, cause the processor to perform operations comprising:
  obtaining, by a transmitting computing device, content to be transmitted via the topic-based messaging protocol;
  determining whether the content to be transmitted should be divided based at least on a transmission category associated with the content;
  responsive to a determination that the content to be transmitted should be divided into a set of sub-portion messages, embedding sub-portion information in individual sub-portions of the set of sub-portion messages corresponding to the content to be transmitted, wherein a number of the set of sub-portion messages is determined based on a message transmission size, and wherein the sub-portion information embedded in the individual sub-portions includes a content identifier, the number of the set of sub-portion messages, and an associated order of the individual sub-portion within the set of sub-portion messages; and
  transmitting, by the transmitting computing device via a network, individual sub-portions of the set of sub-portion messages as individual messages in accordance with a messaging protocol, wherein the messaging protocol implements a message size maximum and wherein the message transmission size is equal to or less than the message size maximum, and wherein transmitting the individual sub-portions of the set of sub-portion messages causes a receiving computing device to:
    responsive to a determination based at least in part on the sub-portion information embedded in received individual sub-portions that a full set of sub-portion messages has been received, process the full set of sub-portion messages to form the content; and
    responsive to a determination based on the sub-portion information that a full set of sub-portion messages has not been received and a determination that a time-to-live criterion has expired, discard the one or more of the individual sub-portions.

18. The non-transitory computer-readable storage medium of claim 17 further comprising determining that the content to be transmitted should be divided based on a size associated with the content exceeding the message size maximum.

19. The non-transitory computer-readable storage medium of claim 17 further comprising determining that the content to be transmitted should be divided based on criteria independent of a size associated with the content.

20. The non-transitory computer-readable storage medium of claim 17, wherein the content identifier comprises a unique identifier associated with the set of sub-portion messages.

21. The non-transitory computer-readable storage medium of claim 20, wherein the unique identifier corresponds to a hash of at least a portion of the content to be transmitted or a unique identifier assigned to the content to be transmitted.

22. The non-transitory computer-readable storage medium of claim 17, wherein the message transmission size is less than the message size maximum and is specified by a network policy.

23. The non-transitory computer-readable storage medium of claim 17 further comprising dynamically modifying the message transmission size.

24. The non-transitory computer-readable storage medium of claim 17, wherein transmitting the individual sub-portions of the set of sub-portion messages as individual messages in accordance with a messaging protocol includes transmitting a set of messages in parallel.

25. The non-transitory computer-readable storage medium of claim 17, wherein transmitting the individual sub-portions of the set of sub-portion messages as individual messages in accordance with a messaging protocol includes transmitting a plurality of copies of individual messages.

* * * * *